Aug. 16, 1932.  G. L. ZUCKER  1,871,487
FUEL ECONOMIZER AND HEAT CONTROL
Filed May 28, 1931   3 Sheets-Sheet 1
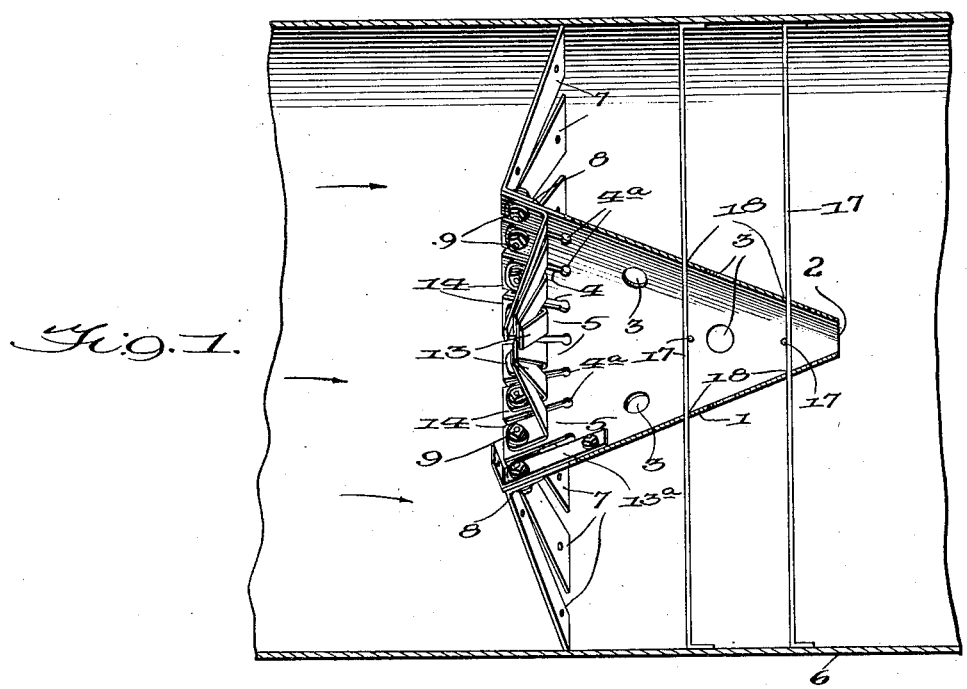
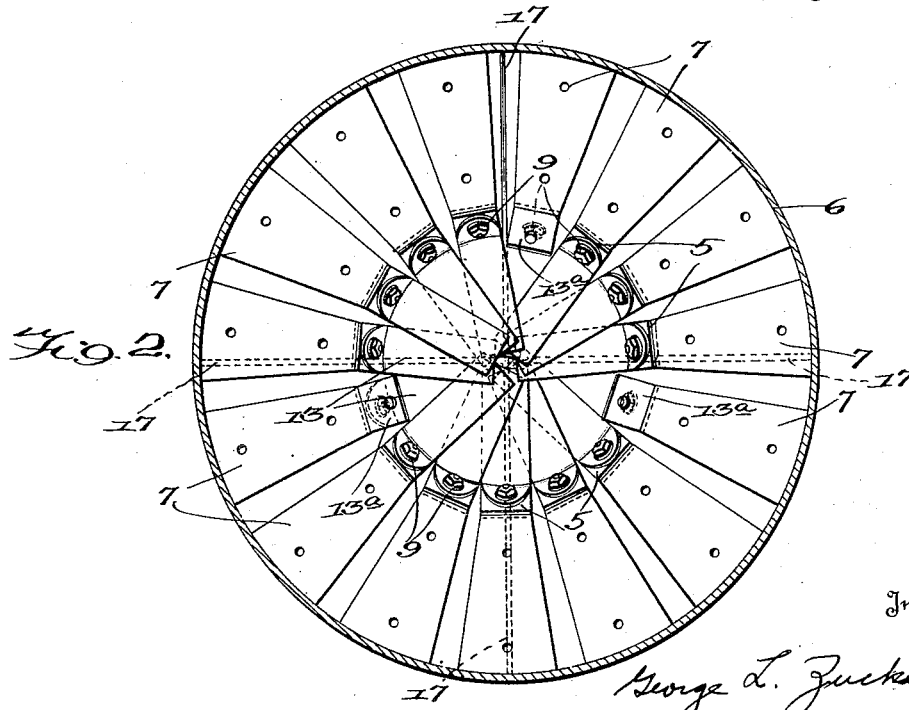
Inventor
George L. Zucker
By Vernon E. Hodges
his Attorney

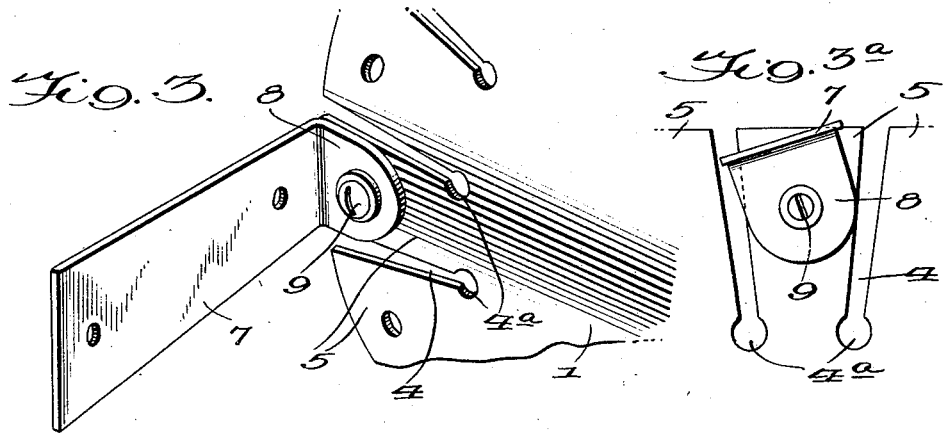
 
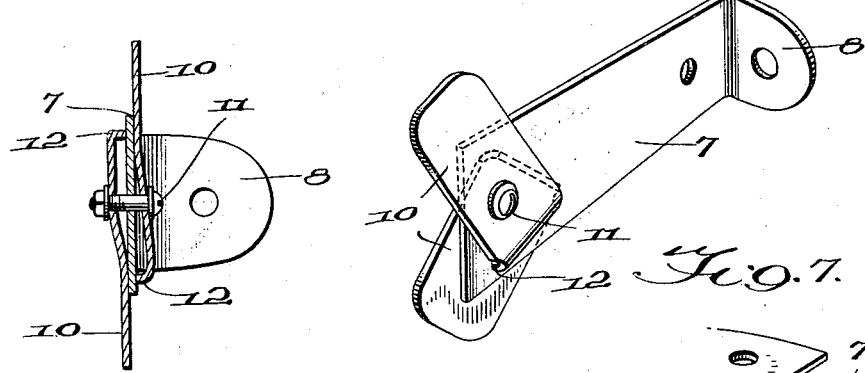
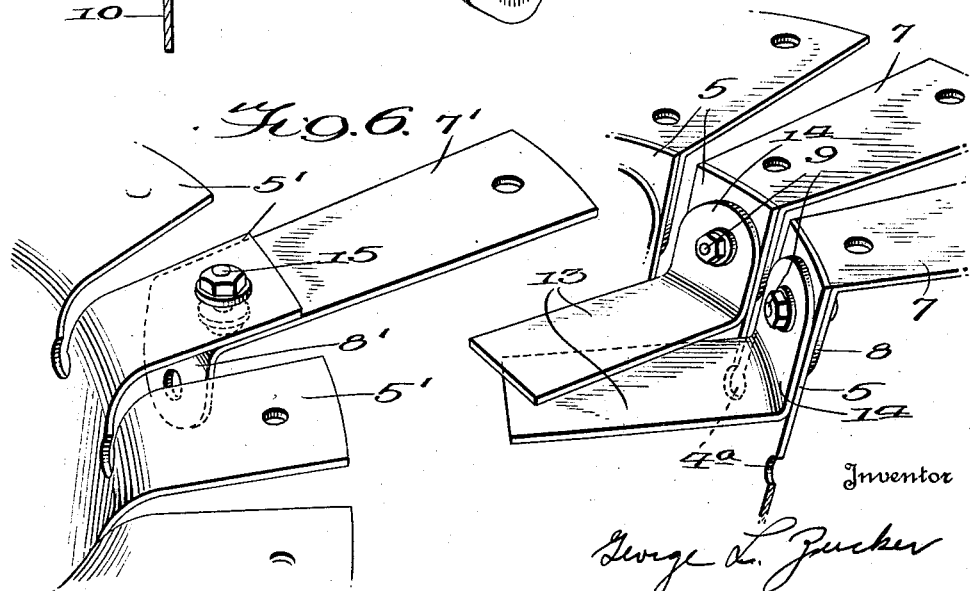

Aug. 16, 1932.   G. L. ZUCKER   1,871,487
FUEL ECONOMIZER AND HEAT CONTROL
Filed May 28, 1931   3 Sheets-Sheet 3
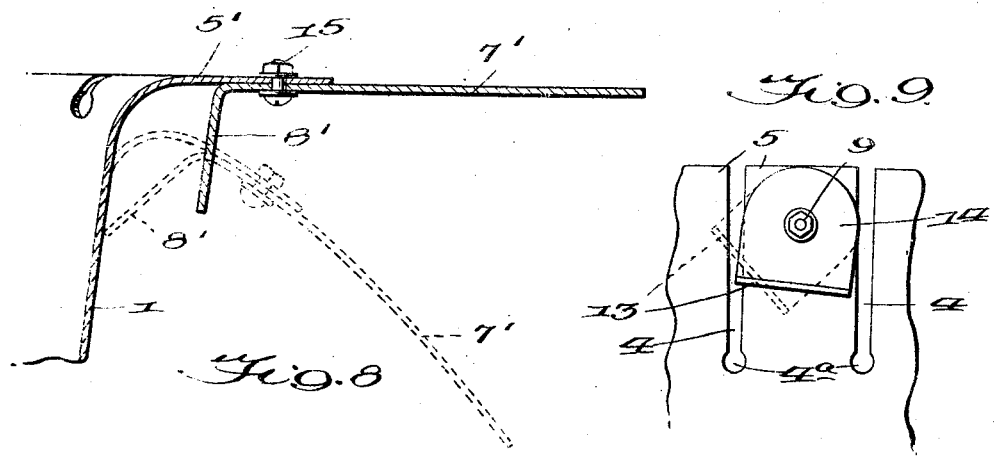
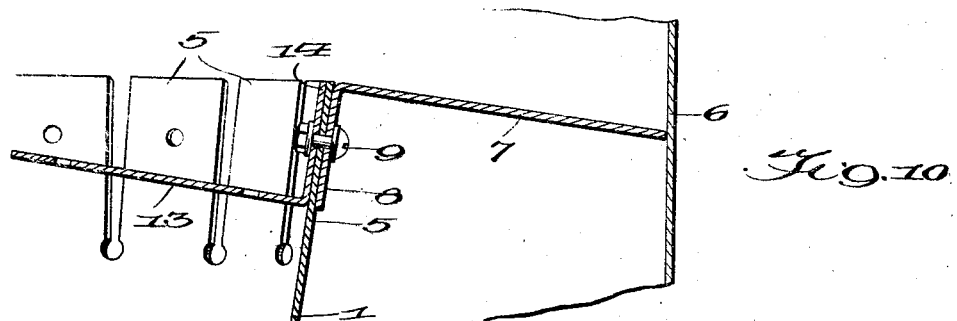
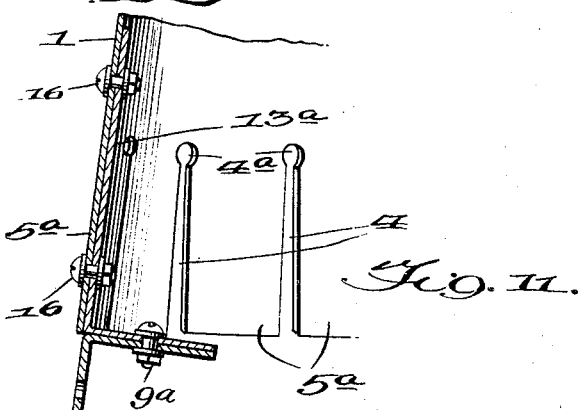

Patented Aug. 16, 1932

1,871,487

UNITED STATES PATENT OFFICE

GEORGE L. ZUCKER, OF EAST ORANGE, NEW JERSEY

FUEL ECONOMIZER AND HEAT CONTROL

Application filed May 28, 1931. Serial No. 540,787.

My invention relates to an improvement in fuel economizers and heat controls.

The object of my present invention is to provide a heat regulator or control which will serve to save and economize fuel and heat by using it and preventing it from going out the chimney before being used. It will also permit of regulating heat exhaust and back draft by providing adjustment of auxiliary wings attached to the tabs of the cone by pivotal connections and by tilting these auxiliary wings at their pivotal points and properly adjusting the tabs, where required the draft opening within the flue or smoke pipe is varied to effect the proper regulation and control of the heat.

The parts are removably attached to the tabs and the cone so that they may be removed therefrom to vary the relative disposition of them in order to provide a master device capable of use in flues or pipes of different sizes for selective heat or fuel control.

Provision is also made for the frictional engagement and adjusting of the device within the flue or pipe to hold the same effectively in position, for which purpose grips may be used and are adjustably supported by the outer ends of the auxiliary wings to engage the sides of the flues or pipes, and, by adjustment of these grips, pipes of different sizes are accommodated to hold and adjust this device effectively therein, and these grips also compensate for uneven chimneys or flues.

In the accompanying drawings:

Fig. 1 is a longitudinal sectional view through a pipe showing the invention supported therein;

Fig. 2 is a transverse sectional view therethrough, showing an end elevation of my improved device;

Fig. 3 is a detail perspective view of one of the tabs showing an auxiliary wing attached thereto;

Fig. 3a is a side elevation thereof;

Fig. 4 is a detail perspective view of one of the auxiliary wings showing the frictional grips attached thereto;

Fig. 5 is a sectional view therethrough;

Fig. 6 is a detail perspective view showing the tabs bent outward, and having an auxiliary wing attached;

Fig. 7 is a detail perspective view showing both the inner and outer auxiliary wings;

Fig. 8 is a sectional view through the form shown in Fig. 6;

Fig. 9 is an end elevation of one of the auxiliary wings attached;

Fig. 10 is a sectional view through the tabs and auxiliary wings; and

Fig. 11 is a sectional view showing a further modification.

As represented particularly in Figs. 1 and 2, a cone is designated generally by the numeral 1, and is usually constructed of sheet-metal, having a central outlet or nozzle 2 at the small end thereof. Orifices 3 are provided in the sides of the cone. At its larger end, the cone is divided by slits 4 into a plurality of tabs 5, which normally extend in alignment with and a continuation of the sides of the cone, but may be bent laterally therefrom, as shown for instance in Figs. 6 and 8 to accommodate flue pipes of different sizes or a different arrangement of the wing structure.

At the inner ends of the slits 4, orifices 4a are formed, as illustrated in Figs. 1 and 3, to prevent the sheet metal from breaking or splitting at these points, and to form vents in addition to the orifices 2 and 3 for the passage and escape of the products of combustion.

The flue pipe is shown at 6 in Figs. 1 and 2 and is normally substantially larger than the diameter of the large end of the cone. Auxiliary wings 7 are provided to extend laterally approximately at right-angles from the tabs 5 on the outer sides thereof and have angular portions 8 formed thereon to engage the outer sides of the tabs 5 as shown in Figs. 1, 3, and 7. Bolts 9 extend through the angular portions 8 and the tabs 5 to tighten and frictionally hold the auxiliary wings 7 in adjusted positions.

As a means of holding the device in a properly spaced position within the flue pipe, the extreme ends of the auxiliary wings 7 may engage the inner wall of the flue pipe as shown in Fig. 1, or some or all of the auxiliary wings 7 may be provided with friction grips 10 disposed on opposite sides of each auxiliary wing 7, where they are adjustably held in place by bolts 11, which pass through the auxiliary wings and through the friction grips 10. The friction grips may be adjusted according to the size of the flue pipe and then tightened by the bolts 11 to securely and properly space my device within the flue pipe. The back ends of the friction grips 10 are turned inward as at 12 to engage the sides of the auxiliary wings 7 to aid in holding the wings and the friction grips 10 in adjusted positions.

Inner auxiliary wings 13 are arranged within the larger end of the cone 1 and are similar to the outer auxiliary wings 7, except in contour.

These inner auxiliary wings 13 have angular portions 14, which extend parallel with the tabs 5 on the inner sides thereof, and are held in place by the bolts 9, which likewise permit adjustment of these auxiliary wings 13 to angular positions in order to regulate the passage of the products of combustion therethrough.

By making the auxiliary wings detachable from the cone and the tabs, the device is adaptable to flue pipes of different sizes and shapes, to properly span the cone therein and to regulate the draft opening therethrough by such adjustment that heat and fuel are conserved and used. The bolts serve to permit angular adjustment of the auxiliary wings to oblique positions relative to the axis of the cone, as shown in Fig. 9, and the extent of this adjustment serves to regulate the draft opening and the back draft through the flue.

In the modification shown in Figs. 6 and 8, the tabs 5' are shown as bent outward laterally from the main portion of the cone 1, and an auxiliary wing 7' is secured to each tab 5' by a bolt 15. This structure is desirable for some arrangements. It allows the slits 4 to be increased for a greater draft. In this form, the angular portions 8' serve as backstops to brace the auxiliary wings.

In some instances, it is desirable to support the cone from its end, instead of the sides of the flue, and to permit this the inner auxiliary wings 13a (see Fig. 11) may be secured by bolts 16 to the inner sides of the cone and tabs 5a to reinforce the same, and the outer auxiliary wings 7a have their ends secured to the ends of the auxiliary wings 13a, by bolts 9a.

As a means of bracing the smaller end of the cone, brace-rods 17 may be employed, extending through holes 18 in the sides of the cone at right-angles to each other. The outer end of these brace-rods 17 may be bent to engage the inner wall of the flue pipe 6, as shown in Fig. 1.

By the use of this device, a very simple contrivance is provided for use in any pipe or chimney or flue. It does not stop the necessary draft through the pipe, chimney or flue, but it does retard the products of combustion, and allows them to be consumed within the stove or furnace, and employs produced heat so that the large percentage of the heat units may be utilized rather than wasted. This is particularly true when heat in a heating chamber is employed independently of a direct fire source.

The invention also prevents excessive heat and exhaust in the flue; it stops back draft, and permits control and employment of heat in the heating-chamber. In addition, it is selective or adjustable not only to different size flue pipes but to regulate the openings therethrough, both through and around the perforated cone.

In applying the device to a flue pipe, it is fitted thereto by the necessary tilting and swing of the wings and by tightening of the grips to securely and frictionally hold the device in place, and at the same time to obtain the proper draft or exhaust opening through the flue pipe. The wings should be adjusted until this condition is obtained.

I claim:

1. A master device of the character described adapted for use in a passageway and comprising a perforated member, a plurality of radially arranged auxiliary wings for regulating the passageway relative to said perforated member, and pivotal supports for said auxiliary wings, the axis of each of the pivotal supports extending approximately radially of the perforated member.

2. A master device of the character described adapted for use in a passageway and comprising a perforated member, a plurality of radially arranged auxiliary wings for regulating the passageway relative to said perforated member, each of said auxiliary wings having an angular portion fixed thereto, and pivotal supports for said auxiliary wings, the axis of each of the pivotal supports extending radially of the perforated member and transverse of the longitudinal axis of said perforated member.

3. A master device of the character described comprising a perforated cone carrying tabs at its large end, a plurality of radially arranged auxiliary wings for regulating the passageway through said perforated cone, each of said auxiliary wings having an angular portion extending laterally therefrom, and pivotal supports for connecting the angular portions with the tabs to pivotally support the auxiliary wings, the axis of each of said pivotal supports extending radially of the perforated cone and transverse of the longitudinal axis of said perforated cone.

4. A device of the character described comprising a perforated cone having a plurality of tabs arranged at its large end, a plurality of radially arranged auxiliary wings extending laterally from the tabs on the outer side of the cone, for regulating a passageway about the perforated cone, and for positioning the cone within a flue, each of said auxiliary wings having an angular portion extending laterally therefrom, and pivotal supports for the auxiliary wings and extending radially through the angular portions and the tabs, the axis of each of the pivotal supports extending radially of the perforated member and transverse of the longitudinal axis thereof, permitting swinging adjustment of said auxiliary wings.

5. A device of the character described comprising a perforated member, a plurality of auxiliary wings extending outwardly from the side walls of said perforated member, a plurality of auxiliary wings extending inwardly from the side walls of said perforated member and pivotal supports for the auxiliary wings permitting swinging movement thereof to adjust the passageways through and about the perforated member.

6. A device of the character described comprising a perforated member, a plurality of auxiliary wings extending laterally, outwardly of the perforated member, a plurality of auxiliary wings extending inwardly from the side walls of said perforated member and pivotal supports for connecting the auxiliary wings with the perforated member, the axis of each of the supports extending radially of the perforated member.

7. A device of the character described comprising a perforated cone carrying tabs at the large end thereof, a plurality of radially arranged auxiliary wings extending outwardly of the cone, a plurality of radially arranged auxiliary wings extending inwardly of the cone, said outer and inner wings extending from opposite sides of the tabs, and means for pivotally connecting the auxiliary wings with the tabs.

8. A device of the character described comprising a perforated cone having its large end slitted longitudinally and forming tabs, a plurality of auxiliary wings supported by the tabs and extending laterally from the perforated cone, and means for pivotally connecting the tabs and auxiliary wings together.

9. In a device of the character described, the combination with a perforated member having laterally extending wings carried thereby, of means for frictionally holding the perforated member properly disposed in a pipe and including one or more grip members, and locking means for pivotally connecting said grip members with the wings.

10. In a device of the character described, the combination of a perforated cone, having its larger end slotted longitudinally forming tabs, and having said tabs bent laterally from the cone, and one or more auxiliary wings pivoted to the tabs and extending outwardly therefrom.

11. In a device of the character described, the combination of a perforated cone, having its larger end slotted longitudinally forming tabs, and having said tabs bent laterally from the cone, and one or more auxiliary wings pivoted to the tabs and extending outwardly therefrom, and laterally extending portions fixed to the auxiliary wings and adapted to engage the cone.

12. In a device of the character described, the combination of a perforated cone, a reinforcing member fixed to the cone and having a laterally extending portion, an auxiliary wing having a laterally extending portion, and means for detachably securing the laterally extending portions together.

In testimony whereof I affix my signature.

GEORGE L. ZUCKER.